United States Patent
Zhang et al.

(10) Patent No.: US 12,395,363 B2
(45) Date of Patent: Aug. 19, 2025

(54) BLOCKCHAIN-BASED POWER DATA TRANSMISSION CONTROL METHOD AND DEVICE AND STORAGE MEDIUM

(71) Applicant: DONGGUAN POWER BUREAU OF GUANGDONG POWER GRID CO., LTD., Dongguan (CN)

(72) Inventors: Xiang Zhang, Dongguan (CN); Xian Yang, Dongguan (CN); Jinman Luo, Dongguan (CN); Yundan Lin, Dongguan (CN); Qiang Zhang, Dongguan (CN); Zhuxiang Kuang, Dongguan (CN); Wenhao Liu, Dongguan (CN); Ling Yu, Dongguan (CN); Yubin Zhang, Dongguan (CN)

(73) Assignee: DONGGUAN POWER BUREAU OF GUANGDONG POWER GRID CO., LTD., Dongguan (CN)

( * ) Notice: Subject to any disclaimer, the term of this patent is extended or adjusted under 35 U.S.C. 154(b) by 0 days.

(21) Appl. No.: 18/876,828

(22) PCT Filed: Aug. 19, 2024

(86) PCT No.: PCT/CN2024/113121
§ 371 (c)(1),
(2) Date: Dec. 19, 2024

(87) PCT Pub. No.: WO2025/044818
PCT Pub. Date: Mar. 6, 2025

(65) Prior Publication Data
US 2025/0175356 A1    May 29, 2025

(30) Foreign Application Priority Data
Aug. 30, 2023   (CN) .................. 202311100379.9

(51) Int. Cl.
H04L 1/00      (2006.01)
H04L 9/00      (2022.01)
(Continued)

(52) U.S. Cl.
CPC .............. H04L 9/50 (2022.05); *H04L 1/0006* (2013.01)

(58) Field of Classification Search
CPC ..... H02J 13/00007; H04L 1/0006; H04L 9/50
See application file for complete search history.

(56) References Cited

U.S. PATENT DOCUMENTS

| 2001/0003527 | A1* | 6/2001 | Shinohara | ............... | H03M 7/30 |
| | | | | | 370/521 |
| 2006/0126890 | A1* | 6/2006 | Shi | ........................ | G06T 1/0028 |
| | | | | | 382/240 |
| 2023/0036609 | A1* | 2/2023 | Chiu | ................... | H04L 63/1425 |

FOREIGN PATENT DOCUMENTS

| CN | 101038303 A | * | 9/2007 | ............. G01R 13/00 |
| CN | 101127454 A | | 2/2008 | |

(Continued)

OTHER PUBLICATIONS

Gill et al, "A Metaheuristic Approach to Secure Multimedia Big Data for IoT Based Smart City Applications", 2021, 10 pages, downloaded from https://onlinelibrary.wiley.com/doi/full/10.1155/2021/7147940 (Year: 2021).*

(Continued)

*Primary Examiner* — Robert E Fennema
*Assistant Examiner* — Olvin Lopez Alvarez
(74) *Attorney, Agent, or Firm* — CM Law; Stephen J. Weed

(57) ABSTRACT

A blockchain-based power data transmission control method includes: determining characteristic information of to-be-transmitted power data; compressing the to-be-transmitted (Continued)

power data according to the characteristic information and based on a target transform compression algorithm; generating the reputation value of a power grid system to which the to-be-transmitted power data belongs in response to the credibility of a DAG blockchain being greater than a preset credibility threshold; and determining a target power data transmission mode according to the reputation value and the characteristic information and transmitting target compression power data through the target power data transmission mode.

19 Claims, 3 Drawing Sheets

(51) Int. Cl.
*H04L 67/104* (2022.01)
*H04L 67/12* (2022.01)
*H04L 69/04* (2022.01)

(56) References Cited

FOREIGN PATENT DOCUMENTS

| CN | 106296359 | A | * | 1/2017 | ............ G06Q 30/06 |
|---|---|---|---|---|---|
| CN | 111770148 | A | * | 10/2020 | ............ G06Q 40/04 |
| CN | 112803950 | A | | 5/2021 | |
| CN | 113115315 | A | | 7/2021 | |
| CN | 113868685 | A | | 12/2021 | |
| CN | 115601176 | A | * | 1/2023 | ............ G06Q 40/04 |
| CN | 116633525 | A | * | 8/2023 | ......... H04L 63/0435 |
| CN | 116827488 | A | | 9/2023 | |
| CN | 117750461 | A | * | 3/2024 | ............ H04W 40/22 |
| KR | 101883603 | B1 | | 7/2018 | |
| KR | 101934103 | B1 | | 12/2018 | |
| WO | 2018032372 | A1 | | 2/2018 | |
| WO | 2018224431 | A1 | | 12/2018 | |
| WO | 2022142632 | A1 | | 7/2022 | |

OTHER PUBLICATIONS

Santoso et al, "Power Quality Disturbance Data compression using wavelet Transform methods" 1997, pp. 1250-1257 , downloaded from https://ieeexplore.ieee.org/abstract/document/637001/ (Year: 1977).*

Chen et al, "DEM compression based on integer wavelet transform", 2007, 5 pages, downloaded from https://www.tandfonline.com/doi/abs/10.1007/s11806-007-0038-8 (Year: 2012).*

Khan et al., "Embedded Zerotree Wavelet Based Data Compression for Smart Grid", 2013, pp. 1-8, downloaded from https://ieeexplore.ieee.org/abstract/document/6682511 (Year: 2013).*

1st Chinese Office Action for Chinese application No. 202311100379.9 dated Oct. 7, 2023 (Oct. 7, 2023) 3 pages (English translation—4 pages).

International Search Report for PCT/CN2024/113121 dated Oct. 12, 2024 (Oct. 12, 2024) 2 pages (English translation—3 pages).

Xu, Xiaofei et al. "LZ77 Power Data Compression Algorithm Based on Integer Wavelet Transform" Journal of Xi'an Polytechnic University, vol. 32, No. 3 (Sum. No. 151), Jun. 2018.

* cited by examiner

BLOCKCHAIN-BASED POWER DATA TRANSMISSION CONTROL METHOD AND DEVICE AND STORAGE MEDIUM

CROSS-REFERENCE TO RELATED APPLICATIONS

This is a national stage application filed under 37 U.S.C. 371 based on International Patent Application No. PCT/CN2024/113121, filed on Aug. 19, 2024, which is based on and claims priority to Chinese Patent Application No. 202311100379.9 filed with the China National Intellectual Property Administration (CNIPA) on Aug. 30, 2023, the disclosures of which are incorporated herein by reference in their entireties.

TECHNICAL FIELD

The present application relates to the technical field of data processing, for example, to a blockchain-based power data transmission control method, apparatus and device and a storage medium.

BACKGROUND

In recent years, the security of power data has become increasingly important, but a risk is prone to occur in a transmission process of the power data, resulting in the loss or tampering of the power data. To solve the preceding defects, a common manner is to encrypt to-be-transmitted power data, that is, the encrypted power data is transmitted in a conventional manner, but a user with an ulterior motive can still tamper with the power data in a decryption manner, and the amount of the power data is massive, which ultimately results in low security and efficiency in power data transmission.

SUMMARY

The present application provides a blockchain-based power data transmission control method, apparatus and device and a storage medium to solve the low security and efficiency in power data transmission.

The present application provides a blockchain-based power data transmission control method. The method includes the steps below.

To-be-transmitted power data is acquired, and characteristic information of the to-be-transmitted power data is determined.

The to-be-transmitted power data is compressed according to the characteristic information and based on a target transform compression algorithm to obtain target compression power data.

A reputation value of a power grid system to which the to-be-transmitted power data belongs is generated in response to credibility of a directed acyclic graph (DAG) blockchain being greater than a preset credibility threshold.

A target power data transmission mode is determined according to the reputation value and the characteristic information, and the target compression power data is transmitted through the target power data transmission mode.

Optionally, that the to-be-transmitted power data is compressed according to the characteristic information and based on the target transform compression algorithm to obtain the target compression power data includes the steps below.

A sampling rate of the to-be-transmitted power data is acquired, and a normalization frequency band of the to-be-transmitted power data is determined according to the sampling rate.

The normalization frequency band of the to-be-transmitted power data is normalized in response to the normalization frequency band not being located in a preset interval until a processed normalization frequency band is located in the preset interval.

The processed normalization frequency band is decomposed using a plurality of low-pass filters and a plurality of high-pass filters to obtain low-frequency to-be-transmitted power data and high-frequency to-be-transmitted power data.

Characteristic information of the low-frequency to-be-transmitted power data and characteristic information of the high-frequency to-be-transmitted power data are obtained according to the characteristic information.

A compression coefficient of the low-frequency to-be-transmitted power data is calculated according to the characteristic information of the low-frequency to-be-transmitted power data, and a compression coefficient of the high-frequency to-be-transmitted power data is calculated according to the characteristic information of the high-frequency to-be-transmitted power data.

The low-frequency to-be-transmitted power data is compressed based on the target transform compression algorithm according to the compression coefficient of the low-frequency to-be-transmitted power data to obtain low-compression power data, and the high-frequency to-be-transmitted power data is compressed based on the target transform compression algorithm according to the compression coefficient of the high-frequency to-be-transmitted power data to obtain high-compression power data.

The low-compression power data and the high-compression power data are fused to obtain the target compression power data.

Optionally, that the compression coefficient of the low-frequency to-be-transmitted power data is calculated according to the characteristic information of the low-frequency to-be-transmitted power data and that the compression coefficient of the high-frequency to-be-transmitted power data is calculated according to the characteristic information of the high-frequency to-be-transmitted power data include the steps below.

A low-frequency coefficient and a low-frequency decomposition series are obtained according to the characteristic information of the low-frequency to-be-transmitted power data.

A high-frequency coefficient and a high-frequency decomposition series are obtained according to the characteristic information of the high-frequency to-be-transmitted power data.

A coefficient vector is generated according to the low-frequency coefficient and the high-frequency coefficient, and a series vector is generated according to the low-frequency decomposition series and the high-frequency decomposition series.

An included angle between the coefficient vector and the series vector is calculated.

The compression coefficient of the low-frequency to-be-transmitted power data is calculated by using the low-frequency coefficient, the low-frequency decomposition series and the included angle through a first compression coefficient calculation formula.

The compression coefficient of the high-frequency to-be-transmitted power data is calculated by using the high-frequency coefficient, the high-frequency decomposition series and the included angle through a second compression coefficient calculation formula.

Optionally, that the reputation value of the power grid system to which the to-be-transmitted power data belongs is generated in response to the credibility of the DAG blockchain being greater than the preset credibility threshold includes the steps below.

The power grid system to which the to-be-transmitted power data belongs is acquired in response to the credibility of the DAG blockchain being greater than the preset credibility threshold.

A transaction contract electricity amount and an actual transaction electricity amount of the power grid system within a preset period are determined.

A transaction deviation electricity amount is calculated according to the transaction contract electricity amount and the actual transaction electricity amount.

The reputation value of the power grid system is calculated according to the transaction contract electricity amount and the actual transaction electricity amount in response to a ratio of the transaction deviation electricity amount to the transaction contract electricity amount being less than an allowable deviation electricity amount.

Optionally, before the power grid system to which the to-be-transmitted power data belongs is acquired in response to the credibility of the DAG blockchain being greater than the preset credibility threshold, the method further includes the steps below.

A target hash value of test power data is calculated through an MD5 message-digest algorithm.

The target hash value is added to a credible DAG blockchain and a DAG blockchain separately.

A first hash value and a second hash value are acquired from the credible DAG blockchain and the DAG blockchain using a target test account respectively.

Credibility of the DAG blockchain is determined according to the first hash value and the second hash value.

The credibility of the DAG blockchain is enhanced through a reliable mechanism for distinguishing service priorities in response to the credibility of the DAG blockchain being less than or equal to the preset credibility threshold.

Whether the enhanced credibility of the DAG blockchain is greater than the preset credibility threshold is determined.

Optionally, that the target power data transmission mode is determined according to the reputation value and the characteristic information and that the target compression power data is transmitted through the target power data transmission mode include the steps below.

A consistency invocation channel, an underlying communication protocol and a power data transmission format are determined according to the reputation value and the characteristic information.

A target transmission protocol is determined according to the consistency invocation channel, the underlying communication protocol and the power data transmission format.

The target power data transmission mode is determined according to the target transmission protocol, and the target compression power data is transmitted through the target power data transmission mode.

Optionally, that the target power data transmission mode is determined according to the target transmission protocol and that the target compression power data is transmitted through the target power data transmission mode include the steps below.

The target power data transmission mode is determined according to the target transmission protocol. Whether the DAG blockchain meets a service delay constraint of a plurality of quality of service (QoS) requirements in a power system is determined.

Reliability of the target compression power data is evaluated in response to the DAG blockchain meeting the service delay constraint of the plurality of QoS requirements in the power system.

In response to an evaluation result meeting a target transmission requirement, the target compression power data is transmitted to the DAG blockchain through the target power data transmission mode, and the DAG blockchain continues to transmit the target compression power data.

The present application further provides a blockchain-based power data transmission control apparatus. The apparatus includes an acquisition module, a compression module, a generation module and a transmission module.

The acquisition module is configured to acquire to-be-transmitted power data and determine characteristic information of the to-be-transmitted power data.

The compression module is configured to compress the to-be-transmitted power data according to the characteristic information and based on a target transform compression algorithm to obtain target compression power data.

The generation module is configured to generate a reputation value of a power grid system to which the to-be-transmitted power data belongs in response to credibility of a directed acyclic graph (DAG) blockchain being greater than a preset credibility threshold.

The transmission module is configured to determine a target power data transmission mode according to the reputation value and the characteristic information and transmit the target compression power data through the target power data transmission mode.

The present application further provides a blockchain-based power data transmission control device. The device includes a memory, a processor and a blockchain-based power data transmission control program stored on the memory and executable on the processor, where the blockchain-based power data transmission control program is configured to perform the preceding blockchain-based power data transmission control method.

The present application further provides a storage medium storing a blockchain-based power data transmission control program which, when executed by a processor, is configured to cause the processor to perform the preceding blockchain-based power data transmission control method.

DETAILED DESCRIPTION

Embodiments described herein are intended to explain and not to limit the present application.

Figure 1:
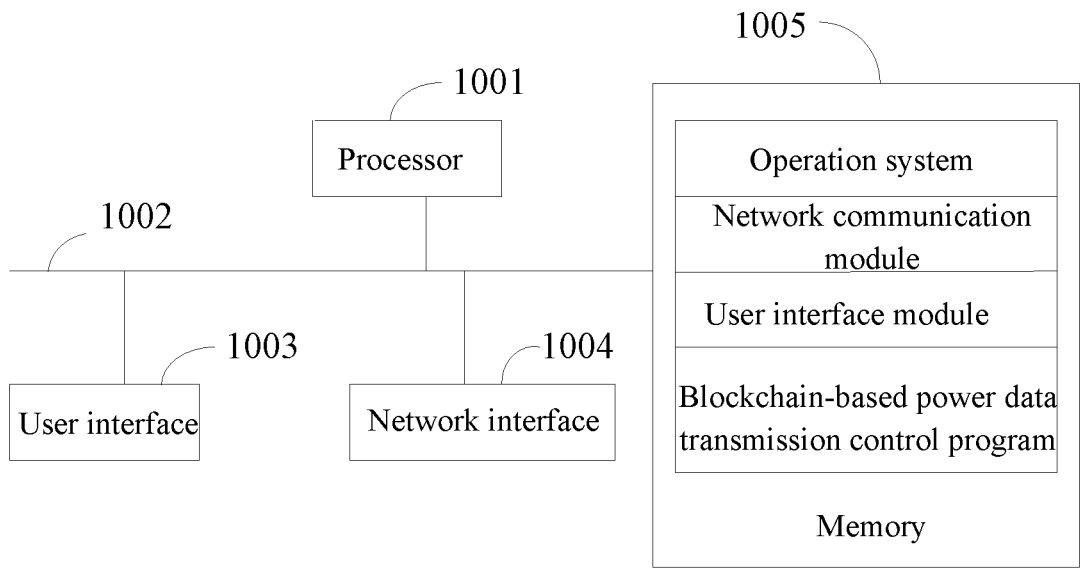
FIG. 1 is a diagram illustrating the structure of a blockchain-based power data transmission control device in a hardware operation environment according to an embodiment of the present application.

Referring to FIG. 1, FIG. 1 is a diagram illustrating the structure of a blockchain-based power data transmission control device in a hardware operation environment according to an embodiment of the present application.

As shown in FIG. 1, the blockchain-based power data transmission control device may include a processor 1001 such as a central processing unit (CPU), a communication bus 1002, a user interface 1003, a network interface 1004 and a memory 1005. The communication bus 1002 is configured to perform connections and communications among these components. The user interface 1003 may include a display screen and an input unit such as a keyboard and may further include a standard wired interface and wireless interface. The network interface 1004 may include a standard wired interface and a wireless interface (such as a wireless-fidelity (Wi-Fi) interface). The memory 1005 may be a high-speed random access memory (RAM) or a stable non-volatile memory (NVM) such as a disk memory. The memory 1005 may also be a storage apparatus independent of the preceding processor 1001.

The structure shown in FIG. 1 does not limit the blockchain-based power data transmission control device and may include more or fewer components than those shown, a combination of some components, or a different arrangement of components.

As shown in FIG. 1, as a storage medium, the memory 1005 may include an operation system, a network communication module, a user interface module and a blockchain-based power data transmission control program.

In the blockchain-based power data transmission control device shown in FIG. 1, the network interface 1004 is mainly configured to perform data communication with a network integration platform workbench; the user interface 1003 is mainly configured to perform data interaction with a user; and the processor 1001 and the memory 1005 in the blockchain-based power data transmission control device in the present application may be disposed in the blockchain-based power data transmission control device, and the blockchain-based power data transmission control device invokes the blockchain-based power data transmission control program stored in the memory 1005 through the processor 1001 and performs a blockchain-based power data transmission control method provided in an embodiment of the present application.

Based on the preceding hardware structure, embodiments of the present application provide a blockchain-based power data transmission control method.

Figure 2:
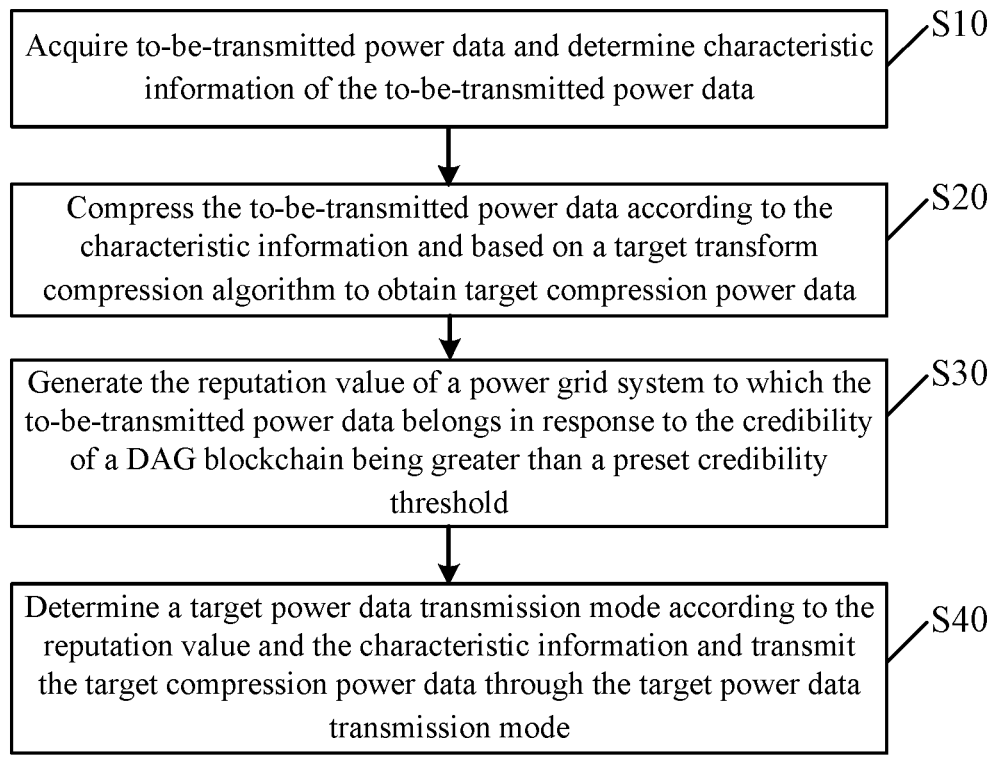
FIG. 2 is a flowchart of a blockchain-based power data transmission control method according to a first embodiment of the present application.

Referring to FIG. 2, FIG. 2 is a flowchart of a blockchain-based power data transmission control method according to a first embodiment of the present application.

In the first embodiment, the blockchain-based power data transmission control method includes the steps below.

In S10, to-be-transmitted power data is acquired, and characteristic information of the to-be-transmitted power data is determined.

This embodiment is executed by a blockchain-based power data transmission control device or may also be executed by another device capable of performing the same or similar function, such as a data transmission controller. This is not limited in this embodiment. The data transmission controller is used as an example in this embodiment for illustration.

The to-be-transmitted power data refers to power data that a power grid system is required to transmit to a power data analysis department. Due to the arrangement of an intranet, the efficiency and security in data interaction performed between the power grid system and the power data analysis department are low. Therefore, through the access of the blockchain in the present application, the to-be-transmitted power data can be transmitted to the power data analysis department quickly and securely. The characteristic information refers to relevant information exclusive to the characteristics of the to-be-transmitted power data. The characteristic information includes, but is not limited to, a timestamp, voltage fluctuation information, and frequency.

In S20, the to-be-transmitted power data is compressed according to the characteristic information and based on a target transform compression algorithm to obtain target compression power data.

The target transform compression algorithm refers to an algorithm for compressing the to-be-transmitted power data. The target transform compression algorithm may be a Ray-Period compression algorithm based on integer wavelet transform. The amount of the target compression power data compressed based on the target transform compression algorithm is much smaller than the amount of the to-be-transmitted power data so that the efficiency in power data transmission can be effectively improved.

Exemplarily, S20 includes that the sampling rate of the to-be-transmitted power data is acquired, and a normalization frequency band of the to-be-transmitted power data is determined according to the sampling rate; the normalization frequency band of the to-be-transmitted power data is normalized when the normalization frequency band is not located in a preset interval until a processed normalization frequency band is located in the preset interval; the processed normalization frequency band is decomposed using multiple low-pass filters and multiple high-pass filters to obtain low-frequency to-be-transmitted power data and high-frequency to-be-transmitted power data; characteristic information of the low-frequency to-be-transmitted power data and characteristic information of the high-frequency to-be-transmitted power data are obtained according to the characteristic information; a compression coefficient of the low-frequency to-be-transmitted power data is calculated according to the characteristic information of the low-frequency to-be-transmitted power data, and a compression coefficient of the high-frequency to-be-transmitted power data is calculated according to the characteristic information of the high-frequency to-be-transmitted power data; the low-frequency to-be-transmitted power data is compressed based on the target transform compression algorithm according to the compression coefficient of the low-frequency to-be-transmitted power data to obtain low-compression power data, and the high-frequency to-be-transmitted power data is compressed based on the target transform compression algorithm according to the compression coefficient of the high-frequency to-be-transmitted power data to obtain high-compression power data; and the low-compression power data and the high-compression power data are fused to obtain the target compression power data.

The sampling rate refers to the frequency at which the to-be-transmitted power data of the power grid system is sampled. After the sampling rate of the to-be-transmitted power data is obtained, the normalization frequency band of the to-be-transmitted power data is determined according to the sampling rate. Whether the normalization frequency band is located in the preset interval is determined, and if not, the normalization frequency band of the to-be-transmitted power data is normalized, and the preset interval may be $[-\pi, \pi]$. The processed normalization frequency band is decomposed using the multiple low-pass filters and the multiple high-pass filters to obtain the low-frequency to-be-transmitted power data and the high-frequency to-be-transmitted power data. In this case, a normalization frequency band of the low-frequency to-be-transmitted power data is [0, π/2], and a normalization frequency band of the high-frequency to-be-transmitted power data is (π/2, π]. The compression coefficient of the low-frequency to-be-transmitted power data refers to a coefficient for compressing the low-frequency to-be-transmitted power data. Similarly, the compression coefficient of the high-frequency to-be-transmitted power data refers to a coefficient for compressing the high-frequency to-be-transmitted power data. The compression coefficient of the low-frequency to-be-transmitted power data is different from the compression coefficient of the high-frequency to-be-transmitted power data. After obtaining the low-compression power data and the high-compression power data that are obtained through compression by the target transform compression algorithm, the low-compression power data and the high-compression power data are fused to obtain the target compression power data.

Exemplarily, that the compression coefficient of the low-frequency to-be-transmitted power data is calculated according to the characteristic information of the low-frequency to-be-transmitted power data and that the compression coefficient of the high-frequency to-be-transmitted power data is calculated according to the characteristic information of the high-frequency to-be-transmitted power data include that a low-frequency coefficient and a low-frequency decomposition series are obtained according to the characteristic information of the low-frequency to-be-transmitted power data; a high-frequency coefficient and a high-frequency decomposition series are obtained according to the characteristic information of the high-frequency to-be-transmitted power data; a coefficient vector is generated according to the low-frequency coefficient and the high-frequency coefficient, and a series vector is generated according to the low-frequency decomposition series and the high-frequency decomposition series; an included angle between the coefficient vector and the series vector is calculated; the compression coefficient of the low-frequency to-be-transmitted power data is calculated by using the low-frequency coefficient, the low-frequency decomposition series and the included angle through a first compression coefficient calculation formula; and the compression coefficient of the high-frequency to-be-transmitted power data is calculated by using the high-frequency coefficient, the high-frequency decomposition series and the included angle through a second compression coefficient calculation formula.

After the low-frequency coefficient, the low-frequency decomposition series, the high-frequency coefficient and the high-frequency decomposition series are obtained, the coefficient vector is generated according to the low-frequency coefficient and the high-frequency coefficient, the series vector is generated according to the low-frequency decomposition series and the high-frequency decomposition series, and the included angle between the coefficient vector and the series vector is calculated. A formula may be that:

$$\cos\beta = \frac{a \cdot b}{|a| \cdot |b|}.$$

β denotes the included angle between the coefficient vector and the series vector, a denotes the coefficient vector, and b denotes the series vector.

After the included angle between the coefficient vector and the series vector is obtained, the compression coefficient of the low-frequency to-be-transmitted power data is calculated through the first compression coefficient calculation formula, and the formula may be that:

$$m = \sqrt{(d^2 + H_{set1}^2)} + \sin\left(\beta - \frac{d}{H_{set1}} \cdot \pi\right).$$

m denotes the compression coefficient of the low-frequency to-be-transmitted power data, d denotes the low-frequency coefficient, and $H_{set1}$ denotes the low-frequency decomposition series.

After the included angle between the coefficient vector and the series vector is obtained, the compression coefficient of the high-frequency to-be-transmitted power data is calculated through the second compression coefficient calculation formula, and the formula may be that:

$$n = \sqrt{(h^2 + H_{set2}^2)} + \cos\left(\beta - \frac{h}{H_{set2}} \cdot \pi\right).$$

n denotes the compression coefficient of the high-frequency to-be-transmitted power data, h denotes the high-frequency coefficient, and $H_{set2}$ denotes the high-frequency decomposition series.

In S30, the reputation value of a power grid system to which the to-be-transmitted power data belongs is generated in response to the credibility of a directed acyclic graph (DAG) blockchain being greater than a preset credibility threshold.

The reputation value refers to the reputation value of the power grid system to which the to-be-transmitted power data belongs. The higher the reputation value, the lower the possibility of tampering with power data in the power grid system. The DAG blockchain refers to a blockchain configured to receive the power data transmitted by the power grid system. Before the DAG blockchain is used for receiving the to-be-transmitted power data, whether the credibility of the DAG blockchain is greater than the preset credibility threshold requires determination, and if yes, the reputation value of the power grid system to which the to-be-transmitted power data belongs is generated.

In S40, a target power data transmission mode is determined according to the reputation value and the characteristic information, and the target compression power data is transmitted through the target power data transmission mode. The target power data transmission mode refers to a mode through which the target compression power data is transmitted, may be jointly determined according to the reputation value of the power grid system and the characteristic information of the to-be-transmitted power data and is used for transmitting the target compression power data.

Exemplarily, S40 includes that a consistency invocation channel, an underlying communication protocol and a power data transmission format are determined according to the reputation value and the characteristic information; a target transmission protocol is determined according to the consistency invocation channel, the underlying communication protocol and the power data transmission format; and the target power data transmission mode is determined according to the target transmission protocol, and the target compression power data is transmitted through the target power data transmission mode.

The consistency invocation channel refers to a channel of a consistent invocation mode parameter. The underlying communication protocol refers to a protocol configured to establish communication with a receiving object of the to-be-transmitted power data in a transmission process. The power data transmission format refers to a format configured to transmit the to-be-transmitted power data. The target transmission protocol is jointly determined according to the consistency invocation channel, the underlying communication protocol and the power data transmission format and is used for determining the target power data transmission mode. The target power data transmission mode is used for transmitting the target compression power data.

Exemplarily, that the target power data transmission mode is determined according to the target transmission protocol and that the target compression power data is transmitted through the target power data transmission mode include that the target power data transmission mode is determined according to the target transmission protocol; whether the DAG blockchain meets a service delay constraint of multiple quality of service (QoS) requirements in a power system is determined; the reliability of the target compression power data is evaluated in response to the DAG blockchain meeting the service delay constraint of the multiple QoS requirements in the power system; and in response to an evaluation result meeting a target transmission requirement, the target compression power data is transmitted to the DAG blockchain through the target power data transmission mode, and the DAG blockchain continues to transmit the target compression power data.

The service delay constraint refers to a delay constraint that ensures the normal operation of services in the power system. The service delay constraint includes a delay constraint of data arrival or a delay constraint of instruction execution and represents the critical value of a service delay range. After the target power data transmission mode is determined and before the target compression power data is transmitted, whether the DAG blockchain meets the service delay constraint of the multiple QoS requirements in the power system requires determination; if yes, the reliability of the target compression power data is evaluated, and whether the evaluation result meets the target transmission requirement is determined; and if yes, the target compression power data is transmitted to the DAG blockchain through the target power data transmission mode, and the DAG blockchain continues to transmit the target compression power data so that the to-be-transmitted power data can be prevented from being maliciously attacked in the transmission process, such as data tampering and a Sybil attack.

In this embodiment, the to-be-transmitted power data is acquired, and the characteristic information of the to-be-transmitted power data is determined; the to-be-transmitted power data is compressed according to the characteristic information and based on the target transform compression algorithm to obtain the target compression power data; the reputation value of the power grid system to which the to-be-transmitted power data belongs is generated in response to the credibility of the DAG blockchain being greater than the preset credibility threshold; and the target power data transmission mode is determined according to the reputation value and the characteristic information, and the target compression power data is transmitted through the target power data transmission mode. In the preceding manner, the target power data transmission mode is determined according to the reputation value and the characteristic information in response to the credibility of the DAG blockchain being greater than the preset credibility threshold and is used for transmitting the target compression power data so that the security and efficiency in the power data transmission can be effectively improved.

Figure 3:
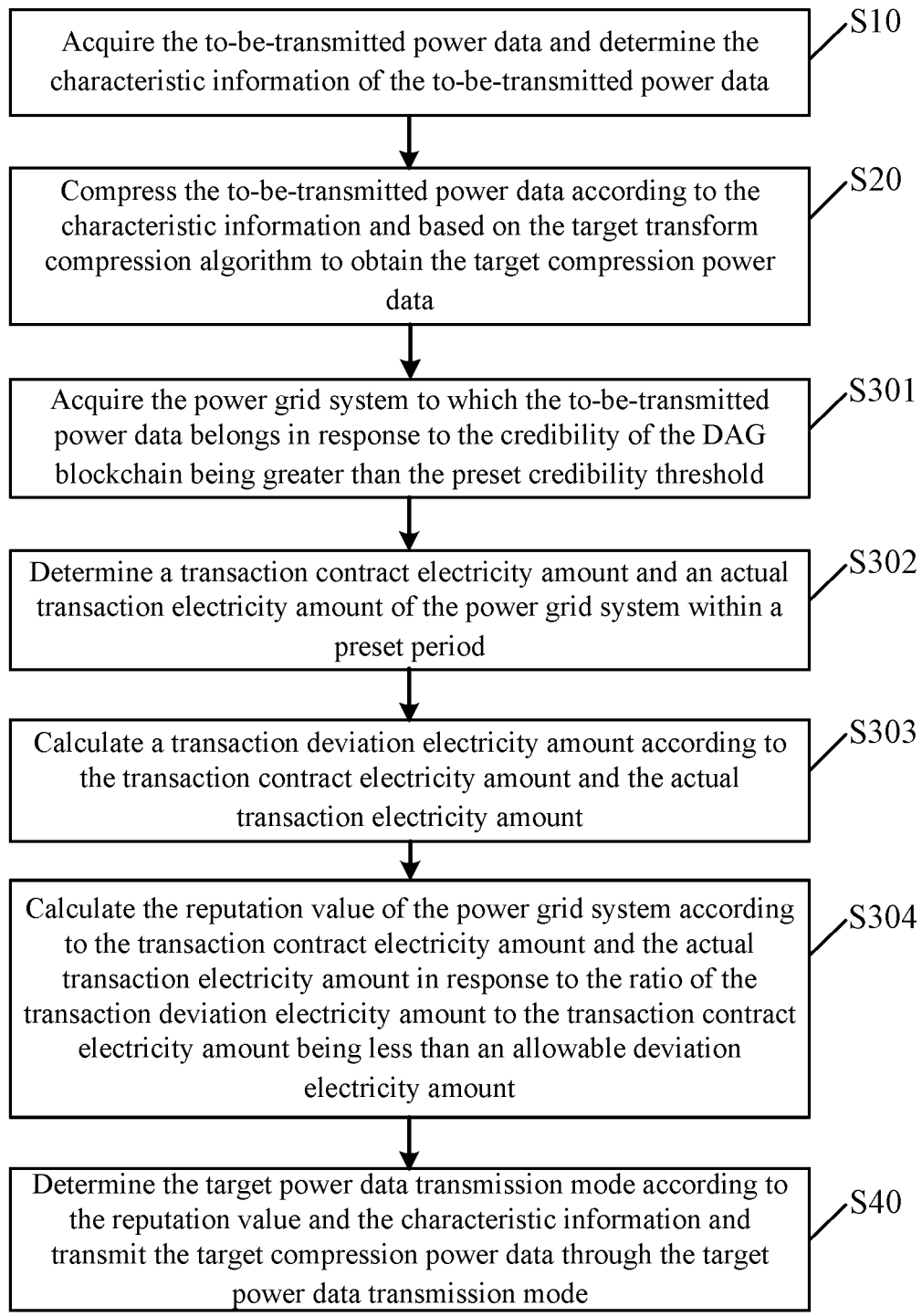
FIG. 3 is a flowchart of a blockchain-based power data transmission control method according to a second embodiment of the present application.

In an embodiment, as shown in FIG. 3, a second embodiment of a blockchain-based power data transmission control method of the present application is provided based on the first embodiment. S30 includes the steps below.

In S301, the power grid system to which the to-be-transmitted power data belongs is acquired in response to the credibility of the DAG blockchain being greater than the preset credibility threshold.

Before the to-be-transmitted power data is transmitted, the credibility of the DAG blockchain is acquired, and whether the credibility of the DAG blockchain is greater than the preset credibility threshold is determined; and if yes, this indicates that the DAG blockchain configured to transmit the to-be-transmitted power data is credible, and the power grid system to which the to-be-transmitted power data belongs is determined according to the characteristic information.

Exemplarily, before S301, the method further includes that the target hash value of test power data is calculated through an message-digest algorithm 5 (MD5); the target hash value is added to a credible DAG blockchain and a DAG blockchain separately; the first hash value and the second hash value are acquired from the credible DAG blockchain and the DAG blockchain using a target test account respectively; the credibility of the DAG blockchain is determined according to the first hash value and the second hash value; the credibility of the DAG blockchain is enhanced through a reliable mechanism for distinguishing service priorities in response to the credibility of the DAG blockchain being less than or equal to the preset credibility threshold; and whether the enhanced credibility of the DAG blockchain is greater than the preset credibility threshold is determined. The first hash value is acquired from the credible DAG blockchain, and the second hash value is acquired from the DAG blockchain. The credibility of the DAG blockchain is calculated according to the first hash value and the second hash value. Whether the credibility of the DAG blockchain is less than or equal to the preset credibility threshold is determined. If yes, the credibility of the DAG blockchain is enhanced through the reliable mechanism for distinguishing the service priorities until the enhanced credibility of the DAG blockchain is greater than the preset credibility threshold. The credible DAG blockchain refers to a DAG blockchain to which a credible mechanism is added. Compared with the DAG blockchain, the credible DAG blockchain has higher credibility and security.

The target test account refers to a test account that accesses a blockchain in the current network environment and acquires the hash value from the blockchain. Exemplarily, a manner in which the first hash value is acquired from the credible DAG blockchain using the target test account is that the target test account is used for being connected to a network of the credible DAG blockchain, a transaction data block is queried through an invocation application interface, and the first hash value is extracted from the transaction data block. Similarly, a manner in which the second hash value is acquired from the DAG blockchain using the target test account is that the target test account is used for being connected to a network of the DAG blockchain, a transaction data block is queried through an invocation application interface, and the second hash value is extracted from the transaction data block. Therefore, there are other manners to acquire the hash values. This is not limited in the present application.

In S302, a transaction contract electricity amount and an actual transaction electricity amount of the power grid system within a preset period are determined.

The transaction contract electricity amount refers to a contract electricity amount transacted by the power grid system within the preset period. The actual transaction electricity amount refers to an actual electricity amount transacted by the power grid system within the preset period.

In S303, a transaction deviation electricity amount is calculated according to the transaction contract electricity amount and the actual transaction electricity amount.

The transaction deviation electricity amount refers to a deviation electricity amount between the transaction contract electricity amount and the actual transaction electricity amount. For example, the transaction contract electricity amount is denoted as $P^{j,t}$, and the actual transaction electricity amount is denoted as $P^{r,t}$, so the transaction deviation electricity amount is that $\Delta P = P^{j,t} - P^{r,t}$.

In S304, the reputation value of the power grid system is calculated according to the transaction contract electricity amount and the actual transaction electricity amount in response to the ratio of the transaction deviation electricity amount to the transaction contract electricity amount being less than an allowable deviation electricity amount.

After the transaction deviation electricity amount is obtained, the ratio of the transaction deviation electricity amount to the transaction contract electricity amount is calculated, that is, the ratio $$\mu = \frac{\Delta P}{P^{r,t}}.$$

Whether the ratio is less than the allowable deviation electricity amount is determined. If yes, the reputation value of the power grid system is calculated according to the transaction contract electricity amount and the actual transaction electricity amount, and the formula may be that:

$$C^t = I \cdot \left(1 - \Delta P / P^{j,t}\right).$$

$C^t$ denotes the reputation value of the power grid system, I denotes a calculation coefficient of the reputation value, and $\Delta P$ denotes the transaction deviation electricity amount, and t denotes the preset period.

In this embodiment, the power grid system to which the to-be-transmitted power data belongs is acquired in response to the credibility of the DAG blockchain being greater than the preset credibility threshold; the transaction contract electricity amount and the actual transaction electricity amount of the power grid system within the preset period are determined; the transaction deviation electricity amount is calculated according to the transaction contract electricity amount and the actual transaction electricity amount; and the reputation value of the power grid system is calculated according to the transaction contract electricity amount and the actual transaction electricity amount in response to the ratio of the transaction deviation electricity amount to the transaction contract electricity amount being less than the allowable deviation electricity amount. In the preceding manner, the transaction deviation electricity amount is calculated according to the transaction contract electricity amount and the actual transaction electricity amount in response to the credibility of the DAG blockchain being greater than the preset credibility threshold, whether the ratio of the transaction deviation electricity amount to the transaction contract electricity amount is less than the allowable deviation electricity amount is determined, and if yes, the reputation value of the power grid system is calculated according to the transaction contract electricity amount and the actual transaction electricity amount so that the accuracy of calculating the reputation value can be effectively improved.

Moreover, embodiments of the present application further provide a storage medium storing a blockchain-based power data transmission control program which, when executed by a processor, is configured to cause the processor to perform the preceding blockchain-based power data transmission control method. The storage medium may be a non-transitory storage medium.

The storage medium adopts all the technical solutions of all the preceding embodiments and thereby at least has all the effects brought about by the technical solutions of all the preceding embodiments. Details are not repeated here.

Figure 4:
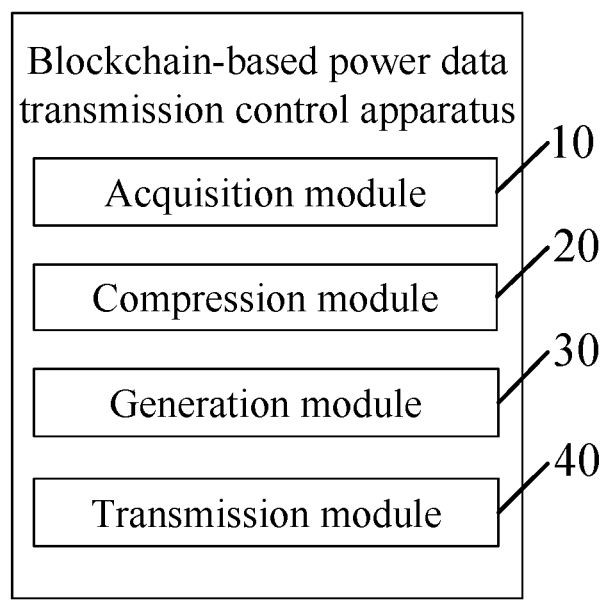
FIG. 4 is a diagram illustrating functional modules of a blockchain-based power data transmission control apparatus according to the present application.

Moreover, referring to FIG. 4, embodiments of the present application further provide a blockchain-based power data transmission control apparatus. The blockchain-based power data transmission control apparatus includes the modules below.

An acquisition module 10 is configured to acquire to-be-transmitted power data and determine characteristic information of the to-be-transmitted power data.

A compression module 20 is configured to compress the to-be-transmitted power data according to the characteristic information and based on a target transform compression algorithm to obtain target compression power data.

A generation module 30 is configured to generate the reputation value of a power grid system to which the to-be-transmitted power data belongs in response to the credibility of a DAG blockchain being greater than a preset credibility threshold.

A transmission module 40 is configured to determine a target power data transmission mode according to the reputation value and the characteristic information and transmit the target compression power data through the target power data transmission mode.

In this embodiment, the to-be-transmitted power data is acquired, and the characteristic information of the to-be-transmitted power data is determined; the to-be-transmitted power data is compressed according to the characteristic information and based on the target transform compression algorithm to obtain the target compression power data; the reputation value of the power grid system to which the to-be-transmitted power data belongs is generated in response to the credibility of the DAG blockchain being greater than the preset credibility threshold; and the target power data transmission mode is determined according to the reputation value and the characteristic information, and the target compression power data is transmitted through the target power data transmission mode. In the preceding manner, the target power data transmission mode is determined according to the reputation value and the characteristic information in response to the credibility of the DAG blockchain being greater than the preset credibility threshold and is used for transmitting the target compression power data so that the security and efficiency in the power data transmission can be effectively improved.

The blockchain-based power data transmission control apparatus provided in this embodiment may refer to the blockchain-based power data transmission control method provided in any embodiment of the present application. Details are not repeated here.

The workflow described in the preceding is illustrative and does not limit the scope of the present application. In practical applications, part or all of the workflow may be selected according to actual requirements to achieve the purpose of the technical solution of this embodiment, and no limitation is made hereto.

Moreover, for technical details not described in detail in this embodiment, references may be made to the blockchain-based power data transmission control method provided in any embodiment of the present application. Details are not repeated here.

Other embodiments or implementation methods of the blockchain-based power data transmission control apparatus described in this application may refer to the preceding multiple method embodiments. Details are not repeated here.

Moreover, as used herein, the term "comprising", "including" or any other variant thereof is intended to encompass a non-exclusive inclusion so that a process, method, article, or system that includes a series of elements not only includes the expressly listed elements but also includes other elements that are not expressly listed or are inherent to such a process, method, article or system. In the absence of more restrictions, the elements defined by the statement "including a . . . " do not exclude the presence of additional identical elements in the process, method, article, or system that includes the elements.

The serial numbers of the preceding embodiments of the present application are for ease of description and do not indicate superiority and inferiority of the embodiments.

The methods in the embodiments described in the preceding may be implemented by software plus a general-purpose hardware platform or may be implemented by hardware. The technical solutions provided in the present application may be embodied in the form of a software product. The computer software product is stored in a storage medium (such as a read-only memory (ROM)/a RAM, a magnetic disk, or an optical disk), and the storage medium includes multiple instructions for enabling a terminal device (which may be a mobile phone, a computer, an integration platform workbench, or a network device) to perform the method described in the multiple embodiments of the present application.

The preceding embodiments are optional embodiments of the present application and are not intended to limit the scope of the present application. Any equivalent structural variations or equivalent process variations made on the basis of the specification and the drawings of the present application, or direct or indirect utilization in other relevant fields all fall within the scope of the present application.

What is claimed is:

1. A blockchain-based power data transmission control method, comprising the following steps:
    acquiring to-be-transmitted power data and determining characteristic information of the to-be-transmitted power data;
    compressing the to-be-transmitted power data according to the characteristic information and based on a target transform compression algorithm to obtain target compression power data;
    in response to credibility of a directed acyclic graph (DAG) blockchain being greater than a preset credibility threshold, generating a reputation value of a power grid system to which the to-be-transmitted power data belongs; and
    determining a target power data transmission mode according to the reputation value and the characteristic information and transmitting the target compression power data through the target power data transmission mode.

2. The blockchain-based power data transmission control method of claim 1, wherein compressing the to-be-transmitted power data according to the characteristic information and based on the target transform compression algorithm to obtain the target compression power data comprises:
    acquiring a sampling rate of the to-be-transmitted power data and determining a normalization frequency band of the to-be-transmitted power data according to the sampling rate;
    in response to the normalization frequency band not being located in a preset interval, normalizing the normalization frequency band of the to-be-transmitted power data until a processed normalization frequency band is located in the preset interval;
    decomposing the processed normalization frequency band using a plurality of low-pass filters and a plurality of high-pass filters to obtain low-frequency to-be-transmitted power data and high-frequency to-be-transmitted power data;
    obtaining characteristic information of the low-frequency to-be-transmitted power data and characteristic information of the high-frequency to-be-transmitted power data according to the characteristic information;
    calculating a compression coefficient of the low-frequency to-be-transmitted power data according to the characteristic information of the low-frequency to-be-transmitted power data and calculating a compression coefficient of the high-frequency to-be-transmitted power data according to the characteristic information of the high-frequency to-be-transmitted power data;
    compressing the low-frequency to-be-transmitted power data based on the target transform compression algorithm and according to the compression coefficient of the low-frequency to-be-transmitted power data to obtain low-compression power data, and compressing the high-frequency to-be-transmitted power data based on the target transform compression algorithm and according to the compression coefficient of the high-frequency to-be-transmitted power data to obtain high-compression power data; and
    fusing the low-compression power data and the high-compression power data to obtain the target compression power data.

3. The blockchain-based power data transmission control method of claim 2, wherein calculating the compression coefficient of the low-frequency to-be-transmitted power data according to the characteristic information of the low-frequency to-be-transmitted power data and calculating the compression coefficient of the high-frequency to-be-transmitted power data according to the characteristic information of the high-frequency to-be-transmitted power data comprise:
    obtaining a low-frequency coefficient and a low-frequency decomposition series according to the characteristic information of the low-frequency to-be-transmitted power data;
    obtaining a high-frequency coefficient and a high-frequency decomposition series according to the characteristic information of the high-frequency to-be-transmitted power data;
    generating a coefficient vector according to the low-frequency coefficient and the high-frequency coefficient, and generating a series vector according to the low-frequency decomposition series and the high-frequency decomposition series;

calculating an included angle between the coefficient vector and the series vector;

calculating the compression coefficient of the low-frequency to-be-transmitted power data by using the low-frequency coefficient, the low-frequency decomposition series and the included angle through a first compression coefficient calculation formula; and calculating the compression coefficient of the high-frequency to-be-transmitted power data by using the high-frequency coefficient, the high-frequency decomposition series and the included angle through a second compression coefficient calculation formula.

4. The blockchain-based power data transmission control method of claim 1, wherein in response to the credibility of the DAG blockchain being greater than the preset credibility threshold, generating the reputation value of the power grid system to which the to-be-transmitted power data belongs comprises:

in response to the credibility of the DAG blockchain being greater than the preset credibility threshold, acquiring the power grid system to which the to-be-transmitted power data belongs;

determining a transaction contract electricity amount and an actual transaction electricity amount of the power grid system within a preset period;

calculating a transaction deviation electricity amount according to the transaction contract electricity amount and the actual transaction electricity amount; and in response to a ratio of the transaction deviation electricity amount to the transaction contract electricity amount being less than an allowable deviation electricity amount, calculating the reputation value of the power grid system according to the transaction contract electricity amount and the actual transaction electricity amount.

5. The blockchain-based power data transmission control method of claim 4, wherein before acquiring the power grid system to which the to-be-transmitted power data belongs in response to the credibility of the DAG blockchain being greater than the preset credibility threshold, the method further comprises:

calculating a target hash value of test power data through a message-digest algorithm 5 (MD5);

adding the target hash value to a credible DAG blockchain and the DAG blockchain separately;

acquiring a first hash value and a second hash value respectively from the credible DAG blockchain and the DAG blockchain using a target test account;

determining the credibility of the DAG blockchain according to the first hash value and the second hash value;

in response to the credibility of the DAG blockchain being less than or equal to the preset credibility threshold, enhancing the credibility of the DAG blockchain through a reliable mechanism for distinguishing service priorities; and determining whether enhanced credibility of the DAG blockchain is greater than the preset credibility threshold.

6. The blockchain-based power data transmission control method of claim 1, wherein determining the target power data transmission mode according to the reputation value and the characteristic information, and transmitting the target compression power data through the target power data transmission mode comprise:

determining a consistency invocation channel, an underlying communication protocol and a power data transmission format according to the reputation value and the characteristic information;

determining a target transmission protocol according to the consistency invocation channel, the underlying communication protocol and the power data transmission format; and determining the target power data transmission mode according to the target transmission protocol, and transmitting the target compression power data through the target power data transmission mode.

7. The blockchain-based power data transmission control method of claim 6, wherein determining the target power data transmission mode according to the target transmission protocol, and transmitting the target compression power data through the target power data transmission mode comprise:

determining the target power data transmission mode according to the target transmission protocol;

determining whether the DAG blockchain satisfies a service delay constraint of a plurality of quality of service (QOS) requirements in a power system;

evaluating reliability of the target compression power data in response to the DAG blockchain satisfying the service delay constraint of the plurality of QOS requirements in the power system; and in response to an evaluation result satisfying a target transmission requirement, transmitting the target compression power data to the DAG blockchain through the target power data transmission mode, and continuing to transmit, by the DAG blockchain, the target compression power data.

8. A blockchain-based power data transmission control device, comprising: a memory, a processor and a blockchain-based power data transmission control program stored on the memory and executable on the processor, wherein the blockchain-based power data transmission control program, when executed by the processor, performs the blockchain-based power data transmission control method of claim 1.

9. A blockchain-based power data transmission control device, comprising: a memory, a processor and a blockchain-based power data transmission control program stored on the memory and executable on the processor, wherein the blockchain-based power data transmission control program, when executed by the processor, is configured to perform the blockchain-based power data transmission control method of claim 2.

10. A blockchain-based power data transmission control device, comprising: a memory, a processor and a blockchain-based power data transmission control program stored on the memory and executable on the processor, wherein the blockchain-based power data transmission control program, when executed by the processor, is configured to perform the blockchain-based power data transmission control method of claim 3.

11. A blockchain-based power data transmission control device, comprising: a memory, a processor and a blockchain-based power data transmission control program stored on the memory and executable on the processor, wherein the blockchain-based power data transmission control program, when executed by the processor, is configured to perform the blockchain-based power data transmission control method of claim 4.

12. A blockchain-based power data transmission control device, comprising: a memory, a processor and a blockchain-based power data transmission control program stored on the memory and executable on the processor, wherein the blockchain-based power data transmission control program, when executed by the processor, is configured to perform the blockchain-based power data transmission control method of claim 5.

13. A blockchain-based power data transmission control device, comprising: a memory, a processor and a blockchain-based power data transmission control program stored on the memory and executable on the processor, wherein the blockchain-based power data transmission control program, when executed by the processor, is configured to perform the blockchain-based power data transmission control method of claim 6.

14. A blockchain-based power data transmission control device, comprising: a memory, a processor and a blockchain-based power data transmission control program stored on the memory and executable on the processor, wherein the blockchain-based power data transmission control program, when executed by the processor, is configured to perform the blockchain-based power data transmission control method of claim 7.

15. A non-transitory storage medium, storing a blockchain-based power data transmission control program, wherein the blockchain-based power data transmission control program, when executed by a processor, is configured to perform the blockchain-based power data transmission control method of claim 1.

16. A non-transitory storage medium, storing a blockchain-based power data transmission control program, wherein the blockchain-based power data transmission control program, when executed by a processor, is configured to perform the blockchain-based power data transmission control method of claim 2.

17. A non-transitory storage medium, storing a blockchain-based power data transmission control program, wherein the blockchain-based power data transmission control program, when executed by a processor, is configured to perform the blockchain-based power data transmission control method of claim 3.

18. A non-transitory storage medium, storing a blockchain-based power data transmission control program, wherein the blockchain-based power data transmission control program, when executed by a processor, is configured to perform the blockchain-based power data transmission control method of claim 4.

19. A non-transitory storage medium, storing a blockchain-based power data transmission control program, wherein the blockchain-based power data transmission control program, when executed by a processor, is configured to perform the blockchain-based power data transmission control method of claim 5.

\* \* \* \* \*